United States Patent [19]

Kobayashi

[11] Patent Number: 4,457,166
[45] Date of Patent: Jul. 3, 1984

[54] ENGINE INTAKE AIR FLOW MEASURING APPARATUS

[75] Inventor: Hiroshi Kobayashi, Yokohama, Japan

[73] Assignee: Nissan Motor Company Limited, Yokohama, Japan

[21] Appl. No.: 393,790

[22] Filed: Jun. 30, 1982

[30] Foreign Application Priority Data

Jul. 3, 1981 [JP] Japan .............................. 56-98571[U]

[51] Int. Cl.³ .......................................... G01M 15/00
[52] U.S. Cl. .................................... 73/118; 73/861.22
[58] Field of Search ................. 73/118, 861.22, 861.23

[56] References Cited

U.S. PATENT DOCUMENTS

| 4,142,407 | 3/1979 | Kuroiwa et al. | 73/118 |
| 4,299,121 | 11/1981 | Asayama et al. | 73/118 |
| 4,334,426 | 6/1982 | Kita et al. | 73/118 |

FOREIGN PATENT DOCUMENTS

| 54-12011 | 1/1979 | Japan . | |
| 55-25509 | 2/1980 | Japan . | |
| 106314 | 8/1980 | Japan | 73/118 |

*Primary Examiner*—Jerry W. Myracle
*Attorney, Agent, or Firm*—Schwartz, Jeffery, Schwaab, Mack, Blumenthal & Koch

[57] ABSTRACT

Under certain engine operating conditions in which fluctuation of the intake air flow into the engine is relatively intense, an appropriate number of Karman vortex pulses are subtracted from the number of the measured Karman vortex pulses. The remaining number of Karman vortex pulses are used to calculate the intake air flow to the engine to improve the measuring accuracy.

11 Claims, 9 Drawing Figures

ENGINE INTAKE AIR FLOW MEASURING APPARATUS

BACKGROUND OF THE INVENTION

The present invention relates to an intake air flow measuring apparatus for an engine, and more particularly to such an apparatus which uses a Karman vortex air flowmeter.

In a conventional electronically controlled fuel injection internal combustion engine, one way of measuring intake air flow into the engine is a digital Karman vortex air flowmeter. The intake air flow measured by the Karman flow meter has been used to control a fuel injector valve to control fuel injection quantity in accordance with the intake air flow. In this case, the Karman vortex air flowmeter includes a pair of hot-wire vortex detectors which produce vortex signals which are then shaped by a waveform shaper. The average number of the shaped Karman vortex signal pulses falling within 720° of crank angle rotation is calculated by reference to four successive 180° crank angle signal pulses. The frequency of the Karman vortex signal is calculated from the number of the Karman vortex signal pulse and engine speed.

However, under certain engine operating conditions, particularly when the throttle valve is fully opened and therefore relatively great fluctuations of intake air flow occur, the calculated intake air flow has been greater than the actual intake air due to time delays inherent in the digital nature of the flowmeter.

SUMMARY OF THE INVENTION

It is an object of the present invention to provide an intake air flow measuring apparatus which reduces systematic error inherent in the Karman flowmeter occurring when intake air flow fluctuates.

According to the present invention, the measured number of Karman vortexes within a predetermined crank angle is reduced by an appropriate number in order to correct the intake air flow calculations under specific operating conditions in which the throttle valve is fully open and fluctuations of intake air are relatively intense due to full opening of the throttle valve.

DETAILED DESCRIPTION OF THE PREFERRED EMBODIMENTS

Figure 1:
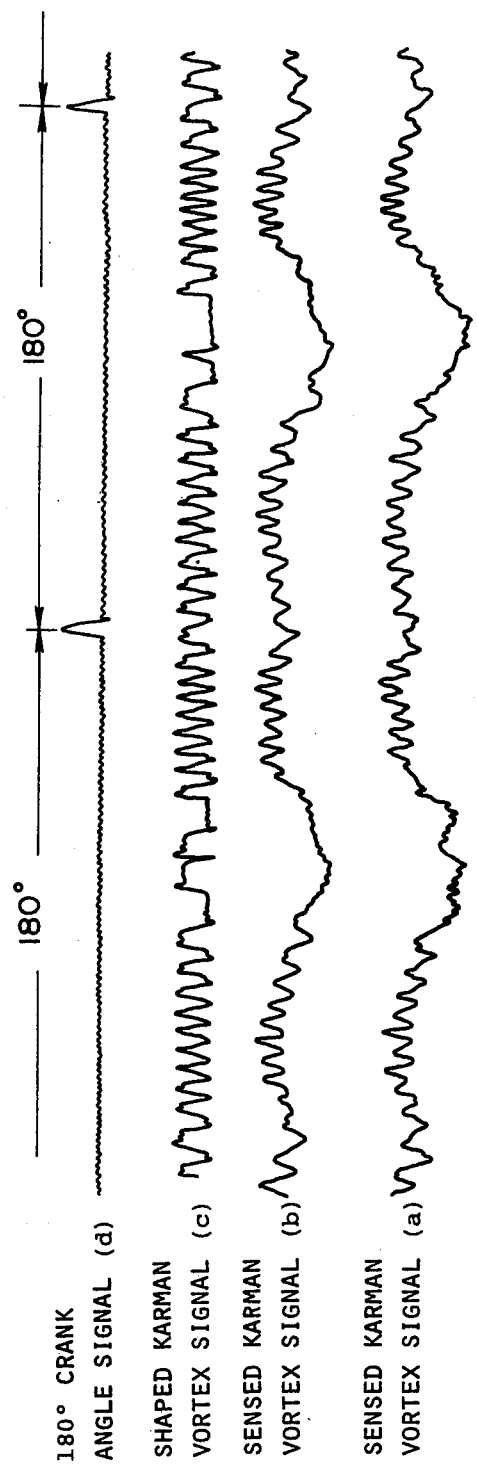
FIG. 1 shows crank angle signal pulses and Karman signal pulses.

To facilitate understanding of the present invention, the prior art mentioned above will be described in more detail with respect to drawings. FIG. 1 shows the data obtained experimentally when the throttle valve is fully open and engine speed is 2,400 rpm. A pair of hot-wire vortex detectors of a Karman vortex flowmeter sense changes in the air flow to the engine to output signals a and b. These signals a and b are differentially processed by a waveform shaper to produce a shaped signal c. The number of shaped signal pulses c is averaged over the time interval in which four successive 180°-crank angle signal pulses d are inputted. The average number of shaped signal pulses and current engine speed are used to calculate the frequency of Karman vortex formation.

Figure 2:
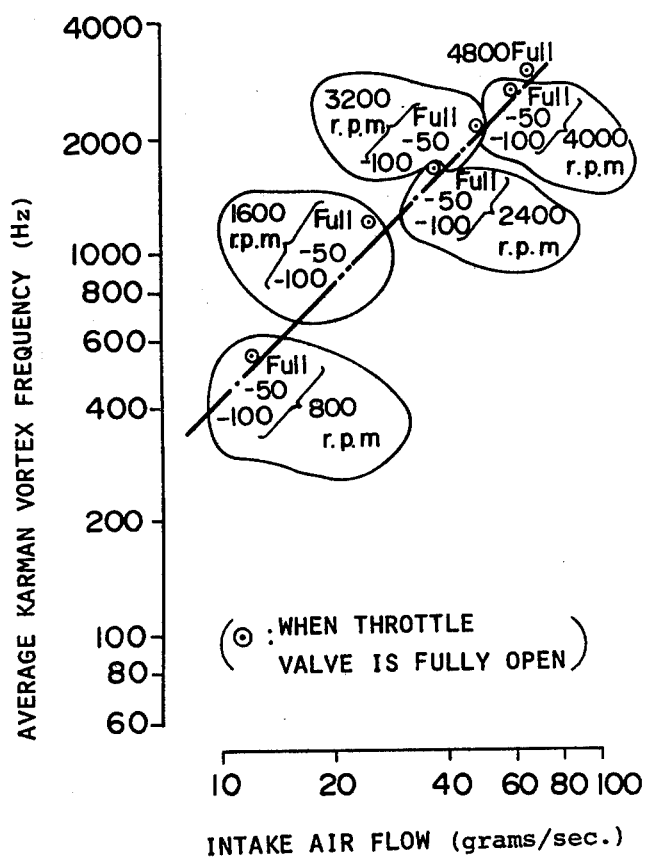
FIG. 2 is a graph of the relationship between average Karman vortex frequency and intake air flow in a Karman vortex flowmeter.

However, when the throttle valve is fully open so that intake air flow fluctuates relatively intensely, the calculated flow of intake air tends to be greater than the actual flow of intake air, thereby resulting in systematic error as shown in FIG. 2. In FIG. 2, the dotted line shows the relationship between average intake air flow calculated from average fuel consumption, or measured from the output of a laminar type air flowmeter, and Karman vortex frequency calculated using the steady-state-flow vs vortex frequency characteristic of the Karman vortex flowmeter. The data represented by encircled dots show the actual values of Karman average frequency vs average intake air flow when the throttle is wide open. This shows that when the throttle valve is fully open, the measured vortex frequency values are displaced with respect to the actual values. When engine speed is as shown and intake vacuum is −100 or −50 mmHg, the Karman vortex flowmeter is quite accurate, whereas when the throttle valve is fully open, the measured frequency of Karman vortex formation exceeds the actual frequency slightly but consistently. This will be described in more detail with respect to FIG. 3 which shows how the intake air flow measured by the Karman vortex flowmeter changes with time in conditions in which the intake air flow fluctuates. The smooth curved line shows the actual intake air flow with time, whereas the stepped curved line shows the intake air flow calculated from the Karman vortex frequency, using the steady-state frequency-intake air flow relationship.

Figure 3:
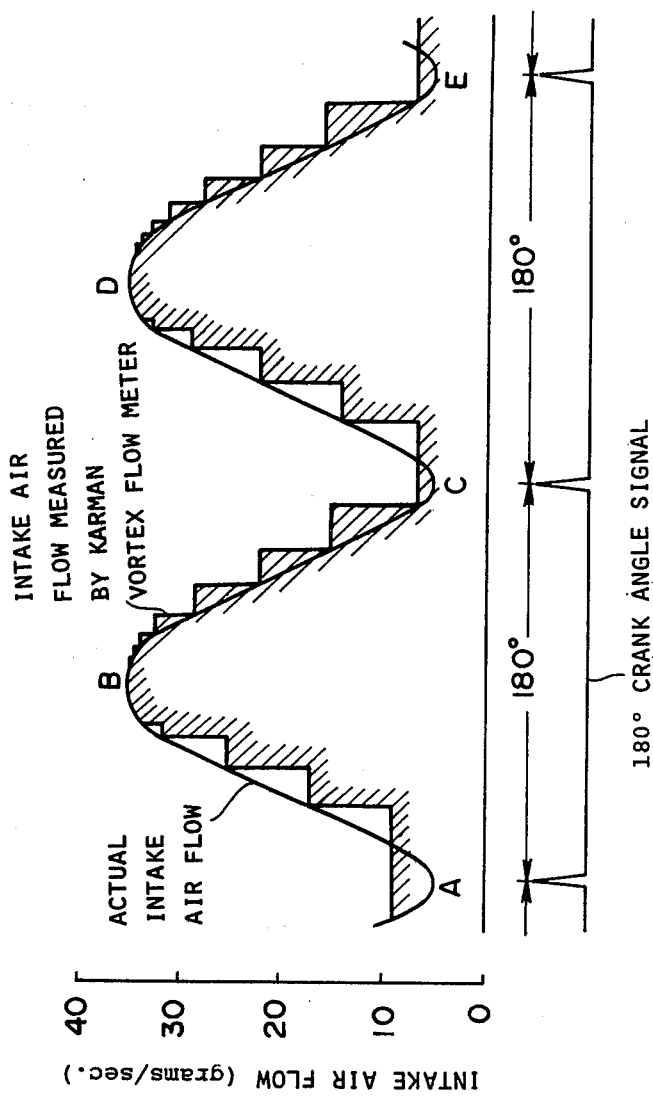
FIG. 3 is a graph of the relationship between intake air flow and crank angle both as measured by the Karman vortex flowmeter and the actual values.

The Karman vortex flowmeter is of the digital type so that its output signal is delayed by a sampling period in which a single vortex pulse is counted. Thus, when the intake air flow is relatively low, the Karman vortex frequency is also low so that the pulse period is relatively long. Thus, changes in the measured intake air flow are delayed with respect to the actual intake air flow. This causes the Karman flowmeter to produce an output displaced with respect to the actual intake air flow. This phenomenom occurs when the throttle valve is fully open so that fluctuations of intake air flow are relatively intense. FIG. 3 also shows that near minimum points A, C, E where the change in intake air flow changes from decreasing to increasing, the Karman vortex flowmeter produces an output higher than the actual intake air flow. Thus, the output of Karman vortex flowmeter tends to be higher than the actual intake air flow.

Figure 4:
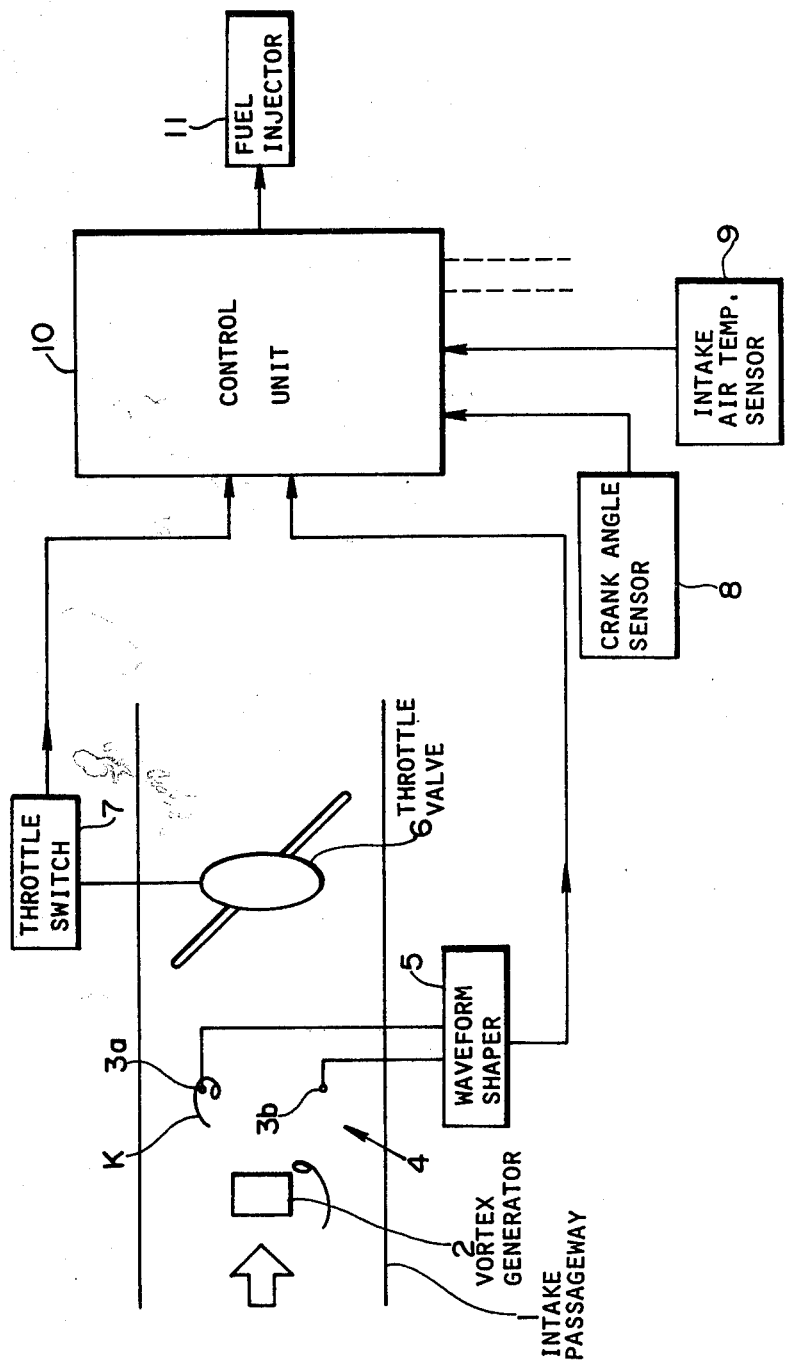
FIG. 4 is a schematic diagram of a preferred embodiment of the present invention.

A preferred embodiment of the present invention which eliminates the above drawbacks is now be described with respect to FIG. 4. A vortex generator 2 is disposed within an air intake passageway 1 so as to disturb laminar air flow therethrough. A pair of hot-wire vortex sensors 3a and 3b are disposed near the edges of the vortex generator, and are subjected to vortexes produced intermittently at the edges of the vortex generator 2. As a result, the heat discharges and therefore the resistances of the hot wires 30a and 30b change and the pair of vortex sensors 3a and 3b produces vortex signal pulses such as a and b in FIG. 1. The vortex generator 2 and the pair of hot-wire vortex sensors 3a and 3b constitute a Karman vortex flowmeter 4. The pair of hot-wire vortex sensors are connected to a waveform shaper 5 to form rectangular pulses synchronized with the Karman vortex frequency.

Figure 5:
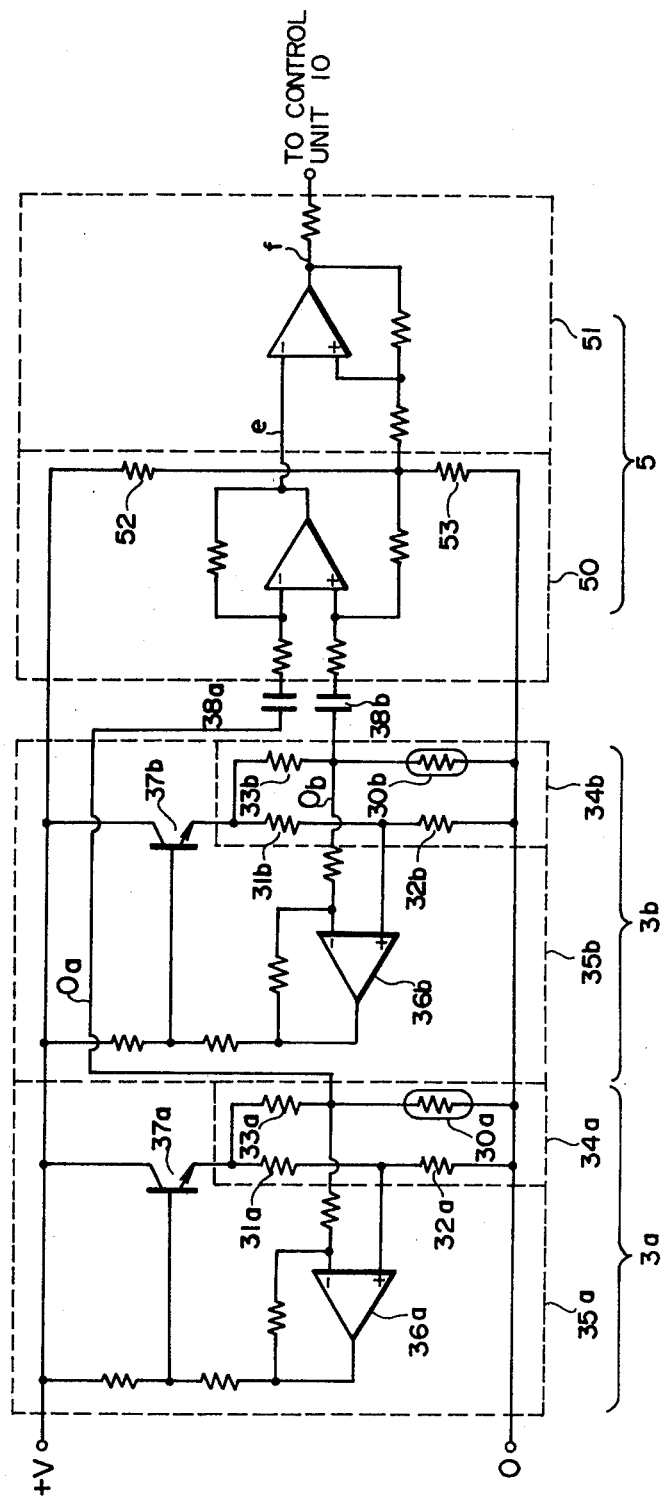
FIG. 5 is a schematic circuit diagram of the Karman vortex flowmeter.

The combined arrangement of vortex sensors 3a and 3b and shaper 5 is shown in FIG. 5. Hot wire 30a and fixed resistors 31a, 32a and 33a constitute a resistance bridge 34a. A constant-voltage control circuit 35a consists mainly of a differential amplifier 36a and a control transistor 37a. It amplifies the inbalanced voltage output of the bridge 34a feeds the output of the amplifier 36a back to the base of the transistor 37a connected to the power supply side of the bridge 34a, and changes the voltage applied to the bridge 34a, thereby maintaining the resistance of hot wire 30a. In the same way, a hot wire 30b and fixed resistors 31b, 32b, 33b constitute a bridge 34b. A constant-voltage control circuit 35b has a similar function to constant-voltage control circuit 35a and consists mainly of a differential amplifier 36b and a control transistor 37b. Thus, the vortex sensors 3a consists of hot wire 30a, bridge 34a and constant-voltage control circuit 35a and sensor 3b consists of hot wire 30b, bridge circuit 34b and constant-voltage control circuit 35b.

Since hot wires 30a and 30b are subjected to the air flow within duct 1, the heat dissipation of hot wires 30a and 30b changes depending on the steady-state air flow and local fluctuations due to Karman vortex occurring therein. Constant-voltage control circuits 35a and 35b will hold the temperature of the hot wires substantially constant against these changes in the heat dissipation so that the voltages applied to hot wires 30a and 30b fluctuate, namely, when the heat dissipation increases, the voltage increases to raise the temperature of the hot wires 30a, 30b.

The fluctuations of these applied voltages are employed as output signals Oa and Ob from the junctions of hot wires 30a and 30b and fixed resistors 33a and 33b, respectively. The output signals Oa and Ob each contain direct components corresponding to the velocities of steady-state flows and alternating components corresponding to local velocity fluctuations of intake air due to Karman vortices. The hot wires 30a and 30b are alternately subjected to Karman vortices K occurring on either side of vortex generator 2 so that the alternating components in the output signals Oa and Ob are synchronous with the generation of vortices, but are 180° out of phase.

The outputs of vortex sensors 3a and 3b are inputted through a pair of coupling capacitors 38a and 38b, which remove direct components from the outputs, to a differential amplifier 50 to be amplified. The output of amplifier 50 is transformed by a wave conversion circuit 51 into a train of rectangular pulses. A voltage at the junction of resistors 52 and 53 connected across a power supply +V is applied as a reference level to the plus input of amplifier 50, and also as a reference level to a comparator constituting the wave conversion circuit 51.

Referring again to FIG. 4, a throttle switch 7 is mounted on a throttle valve 6 within air intake passageway 1 and is closed when throttle valve 6 is opened to an angular position exceeding a predetermined extent of opening.

The Karman vortex pulses of shaper 5, and ON and OFF signals of throttle switch 7 are inputted to a control unit 10 together with the signals from a crank angle sensor 8 and an intake-air temperature sensor 9.

Thus, when vortex generator 2 produces Karman vortexes alternately and regularly on its downstream side, these vortexes are sensed by sensors 3a and 3b, shaped by shaper 5 into a rectangular pulse signal, the frequency of which is measured by control unit 10 to calculate the air intake flow. Throttle switch 7 indicates the level of fluctuation of intake air flow by signalling whether or not the opening of throttle valve 7 exceeds the predetermined opening value. Control unit 10 effects the following signal process in accordance with the signal from throttle switch 7.

When throttle switch 7 is off, namely, when fluctuations in the intake air are relatively weak, the average frequency of Karman vortex formation during rotation of the crankshaft through a predetermined angle is calculated, on the basis of which the intake air flow is calculated. In more detail, Karman vortex signals falling within the predetermined crank angle are stored and averaged in control unit 10. The signal representing the average of these Karman vortex values is sent to a fuel injector 11, thereby causing injector 11 to inject an appropriate amount of fuel.

When throttle switch 7 is on, namely, when intake air fluctuations are relatively intense, an appropriate number of Karman vortex pulses are subtracted, the remaining number of Karman vortex signals being used to calculate the average number of Karman vortex pulses and thereby the intake air flow. In more detail, Karman vortex pulses falling within a crank angle of 720° are stored, an appropriate number of Karman vortex signals are subtracted from them, and the remaining number of Karman vortex pulses are used to calculate an average number of Karman vortex pulses falling within the predetermined crank angle. Then the corresponding intake air flow is calculated. A flowchart for this procedure is shown in FIG. 6.

Figure 6:
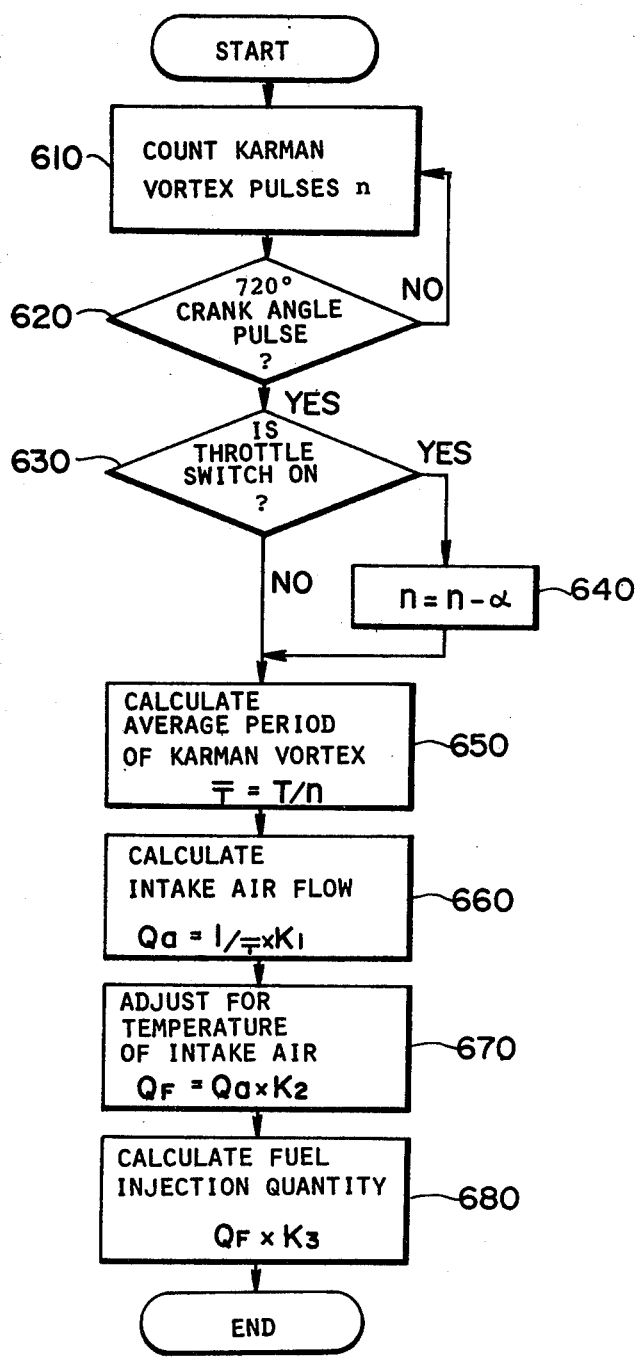
FIG. 6 is a flowchart of the process executed by a control unit of FIG. 4.

In step 610 of FIG. 6, peaks of the shaped Karman vortex signal (c) are counted. In step 620, calculation procedures 630 through 680 are initiated if a signal indicating that the crankshaft has completed two rotations (720°) since the last such signal is received. In this case, the value n of the vortex count from step 610 is read and stored for use in the ensuing calculations, the counter used in step 610 is reset to zero, and control is passed to step 630. The counting procedure of step 610 actually proceeds continuously regardless of other parallel calculations, and only the counter value n is reset when a 720° signal is received.

In step 630, if no signal is received from throttle switch 7, indicating relatively steady air flow, control passes directly to step 650. Otherwise, in the case of fluctuating air flow, the vortex count n is decremented by a predetermined value α before proceeding to step 650. In step 650, the total time T required for the last 720° crankshaft rotation is divided by the vortex count n, either as measured or as decremented, in order to obtain an average vortex period $\overline{T}$, which is used in calculating steps 660–680 to derive the desired fuel injection quantity. In step 660, intake air flow $Qa = 1/T \times K_1$ where $K_1$ is a constant is calculated; in step 670, intake air quantity value $Q_F$ is then adjusted to correct for the air temperature, measured by intake air temperature sensor 9, according to the equation $Q_F = Q_a \times K_2$ where $K_2$ is a constant; and in step 680, the fuel injection quantity $Q_F \times K_3$ is calculated where $K_3$ is a constant.

In order to sense the level of fluctuation of intake air flow by means other than the above-mentioned throttle switch, means can be used to obtain the distribution of Karman vortex pulses within the predetermined crank angle and determine whether the scattering of Karman vortex pulses exceeds a predetermined level. In this case, signal processing required to perform this judgment is shown in a flowchart in FIG. 7.

In this instance, the intervals between each pair of vortices must be determined. This is done in steps 710 and 720. A first counter counts clock pulses in step 710 until a vortex pulse from signal (c) of FIG. 1 is received. Then the clock pulse count $T_i$ is stored, the first counter is reset, and the vortex count n is incremented by one by a second counter in step 730. Control proceeds to step 740, in which calculation procedures 750–810 are initiated if a 720° crankshaft rotation signal pulse is received, as in FIG. 6. Otherwise, the vortex count and period measurement procedures 710–730 are resumed.

In step 750, the standard deviation $\sigma$ of the vortex periods $T_i$ and the average vortex period $\overline{T}$ over the last two crankshaft rotations (720°) are determined according to the vortex count n, the stored vortex period counts $T_i$, and well-known mathematical formulae. In step 760, deviation $\sigma$ is compared to period $\overline{T}$. If the value $\sigma$ exceeds a predetermined fraction (e.g. one-sixth) of value $\overline{T}$, then control goes to step 770, in which the value $\overline{T}$ is multiplied by $n/(n-\alpha)$, where $\alpha$ is a predetermined value. This step has the same corrective function as step 640 in FIG. 6. When the standard deviation $\sigma$ is less than the predetermined fraction of the average vortex period $\overline{T}$, which is the case during relatively steady air flow, control proceeds directly to step 780. Steps 780 through 810 are analogous to steps 650 through 680 of FIG. 6, which the measured, and if necessary, corrected vortex data are used to calculate intake air quantity, and from that, desired fuel injection quantity.

Figure 8:
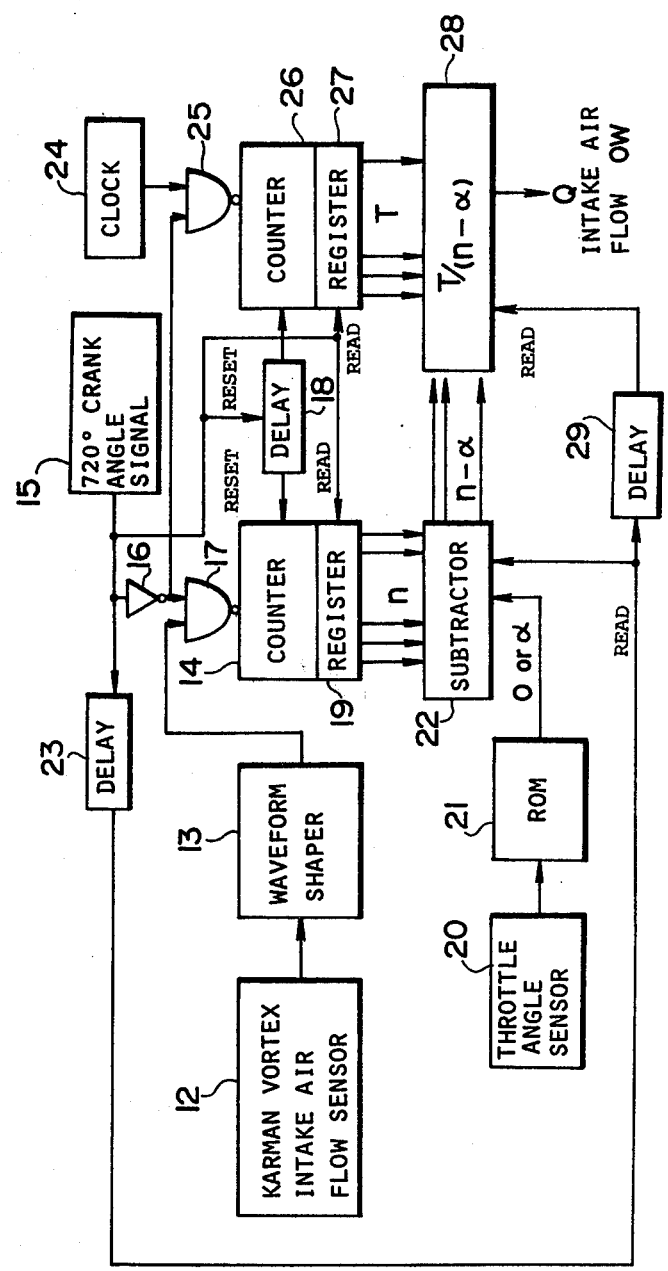
FIG. 8 is a schematic block diagram of the apparatus of the present invention.

FIG. 8 shows another embodiment of the present invention. Reference numeral 12 denotes a Karman vortex sensor including hot-wire vortex sensors such as shown in FIG. 5. Reference numeral 13 denotes a rectangular pulse shaper, similar in structure to 5 in FIG. 5, which shapes the output pulses of Karman vortex sensor 12 into a rectangular pulse train. A counter 14 counts the output pulses from shaper 13 between successive crank angle sensor pulses which are inputted to counter 14 through an inverter 16 and an AND gate 17 to which the vortex pulses are also inputted from shaper 13. Counter 14 is reset after each 720° of crank rotation by a delay circuit 18. A register 19 reads the contents of counter 14 immediately before counter 14 is reset. A throttle opening sensor 20 detects relatively high-load engine conditions during which the number of pulses which Karman vortex flowmeter outputs represents an intake air flow larger by $\alpha$ than the actual intake air flow according to the extent of opening of the throttle valve and produces a signal when the throttle valve is substantially fully open, at which time, a ROM outputs a signal representing a value $\alpha$ (for example $\alpha=2$). Each 720° crank angle signal is applied through a delay circuit 23 to a subtractor 22 to cause same to read the contents of register 19. Then subtractor 22 subtracts the predetermined value $\alpha$, for example, 2, from the output n of register 19, thereby giving the result $n-\alpha$.

Pulses from a clock generator 24 are applied together with the output of an inverter 16 through an AND gate 25 to a counter 26 which counts the pulses from clock generator 24 during the each 720° of crank shaft rotation. A register 27 reads the value of counter 26 in response to a READ signal corresponding to the 720° crank angle signal from crank angle sensor 15 immediately before counter 26 is reset by a crank angle signal via delay circuit 18. An intake air flow calculating unit 28 calculates an intake air flow $T/(n\alpha)$ from the output (T) of register 26 and the output $(n-\alpha)$ of substractor 22 after these outputs are received via a delay circuit 29.

It is also possible to measure intake air flow with a minimal measuring error by setting in advance a correction factor for the number of Karman vortices corresponding to engine speed and subtracting the correction factor from the measured number of Karman vortices depending on the measured engine speed, since the magnitude of fluctuation of intake air flow varies depending on engine speed and load. In this case, the correction factor should be selected such that as engine speed increases, the correction factor increases. A flowchart for this is shown in FIG. 9.

Figure 7:
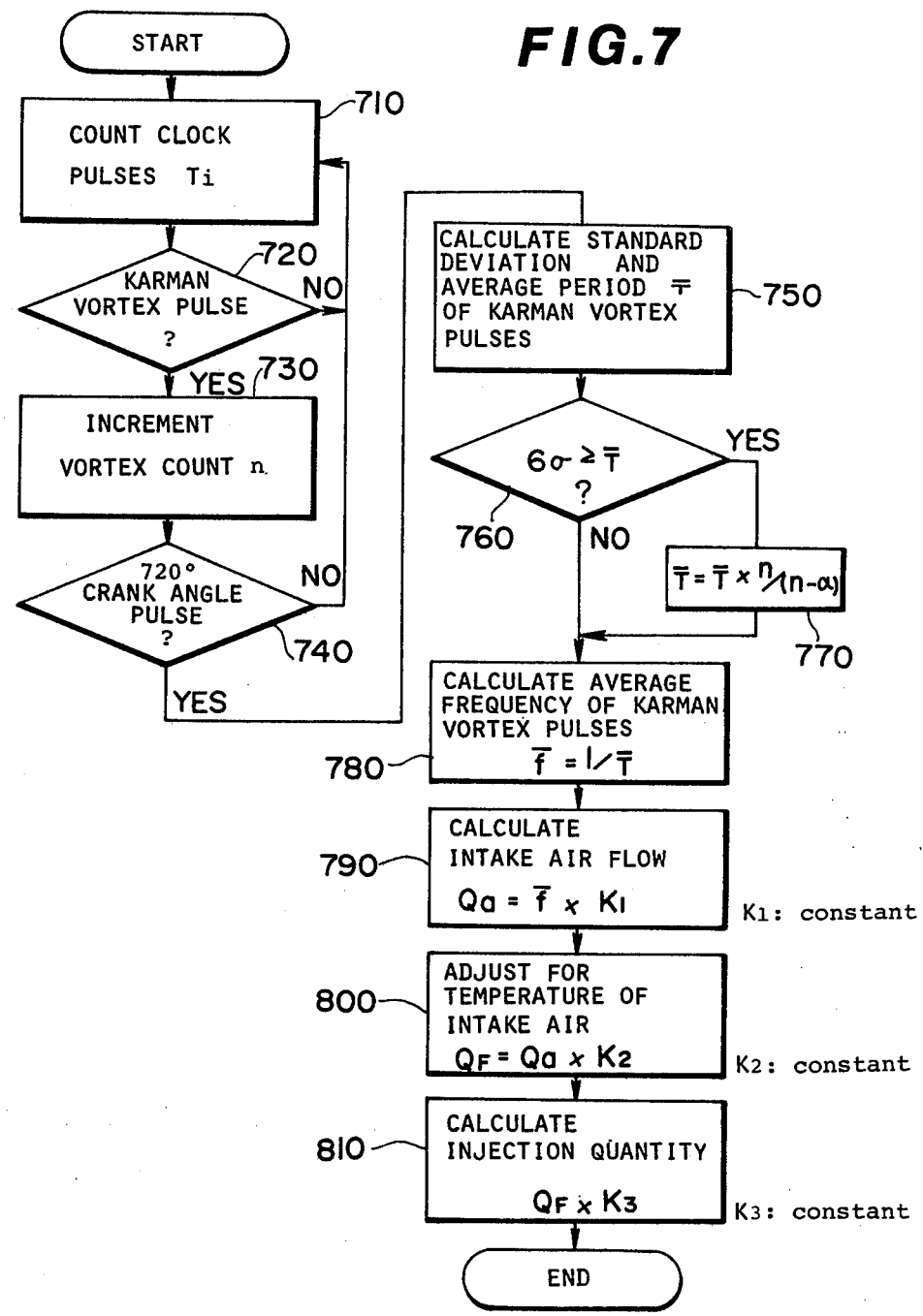
FIG. 7 is a flowchart of another process executed by the control unit of FIG. 4.
Figure 9:
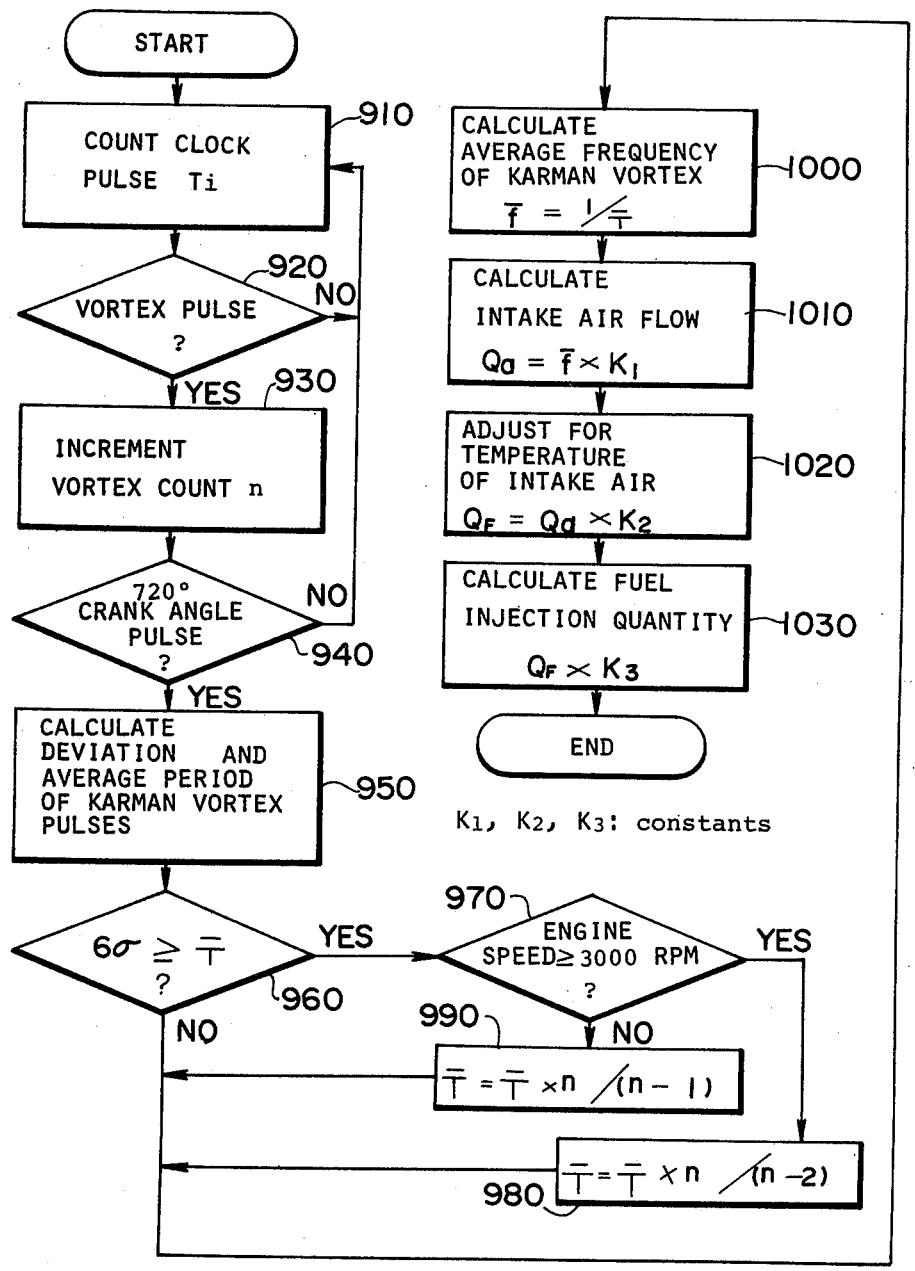
FIG. 9 is a flowchart of a further process executed by the control unit of FIG. 4.

The processing performed in the flow chart in FIG. 9 is very similar to that of FIG. 7. Accordingly, only the differences will be described in detail.

Steps 910 through 960 correspond to steps 710 through 760 of FIG. 7, respectively. In step 960, if standard deviation $\sigma$ is less than the predetermined fraction of the average vortex period $\overline{T}$, then control passes directly to steps 1000–1030, which correspond to steps 780–810 of FIG. 7. Otherwise, control passes to step 970, in which current engine speed is compared to a predetermined, relatively-high value, e.g., 3000 rpm. If engine speed exceeds the predetermined value, control passes to step 980, in which the value $\overline{T}$ is multiplied by $n/(n-2)$. Otherwise, control passes to step 990, in which the value $\overline{T}$ is multiplied by $n/(n-1)$. In both cases, control then passes to calculation steps 1000–1030.

The corrections performed in steps 980 and 990 are analogous to steps 640 of FIG. 6 and 770 of FIG. 7. The advantage of this engine speed-dependent adjustment is based on the digital nature of the vortex sensor. As engine speed increases, the 720° sampling period is accordingly shortening, so that the discrepancy between measured and actual air flow, as shown especially at points A and C in FIG. 3, has a proportionally greater effect on the following calculations. In addition, as engine speed increases, intake air quantity, and thus vortex count n, also tend to increase. This increase is reflected in the increase in the correction factor $\alpha$.

While the present invention has been described and shown in terms of preferred embodiments, it should be noted that the present invention should not be taken to be limited to them. Various modifications and changes could be made by those skilled in the art without departing from the spirit and scope of the present invention as set forth in the attached claims.

What is claimed is:

1. Apparatus for measuring intake air flow into an engine having an intake manifold in which air flow vortices are generated, comprising:
   (a) means for measuring the number of vortices, depending on the intake air flow into the engine, during a predetermined crank angle rotation of said engine;
   (b) means for sensing the magnitude of fluctuation of the intake air flow;
   (c) means responsive to said sensing means for decreasing the measured number of vortices by a predetermined number, when the magnitude of fluctuation of the intake air flow exceeds a predetermined value; and
   (d) means for calculating the average intake air flow in accordance with the number of vortices.

2. Apparatus as claimed in claim 1, wherein said sensing means senses the degree of opening of a throttle valve, and said sensing means determines that the magnitude of fluctuation of the intake air flow exceeds the predetermined value when the opening of the throttle valve exceeds a predetermined amount.

3. A method for measuring intake air flow into an engine having an intake manifold in which air flow vortices are generated, comprising the steps of:
   (a) measuring the number of vortices generated during a predetermined crank shaft rotation;
   (b) measuring the intensity of fluctuation of intake air flow over a time scale shorter than the predetermined crank shaft rotation;
   (c) decreasing the number of vortices by a predetermined number when the intensity of fluctuation exceeds a predetermined value; and
   (d) calculating average intake air flow in accordance with the number of vortices.

4. The method of claim 3, wherein the step of measuring the intensity of fluctuation is performed by detecting whether the opening angle of a throttle valve in the engine exceeds a predetermined amount, and the step of decreasing the number of vortices is performed when the opening angle of the throttle valve exceeds the predetermined amount.

5. The method of claim 3, wherein the step of measuring the intensity of fluctuation is performed by measuring the time intervals between vortices and calculating the standard deviation of the time intervals over the predetermined crank shaft rotation, and the step of decreasing the number of vortices is performed when the standard deviation exceeds a predetermined fraction of the average time interval.

6. The method of claim 3, further comprising the steps of:
   (a) sensing engine speed;
   (b) decreasing the number of vortices by first predetermined number when the intensity of fluctuation exceeds said predetermined value and engine speed exceeds a predetermined engine speed; and
   (c) decreasing the number of vortices by a second predetermined number when the intensity of fluctuation exceeds said predetermined value and engine speed does not exceed said predetermined engine speed.

7. Apparatus for measuring intake air flow into an engine having an intake manifold in which air flow vortices are generated, comprising:
   (a) means for measuring the number of vortices, depending on the intake air flow into the engine, during a predetermined crank angle rotation of said engine;
   (b) means for sensing the magnitude of intake air flow in said intake manifold;
   (c) means responsive to said sensing means for decreasing the measured number of vortices by a predetermined number, when the magnitude of the intake air flow exceeds a predetermined value; and
   (d) means for calculating the average intake air flow in accordance with the number of vortices.

8. Apparatus for measuring intake air flow into an engine having an intake manifold in which air flow vortices are generated, comprising:
   (a) means for measuring the number of vortices generated during a predetermined crank shaft rotation;
   (b) means for measuring the intensity of fluctuation of intake air flow over a time scale shorter than the predetermined crank shaft rotation;
   (c) means for decreasing the number of vortices by a predetermined number when the intensity of fluctuation exceeds a predetermined value; and
   (d) means for calculating average intake air flow in accordance with the number of vortices.

9. The apparatus of claim 8, wherein said means for measuring the intensity of fluctuation comprises means for detecting whether the opening angle of a throttle valve in the engine exceeds a predetermined amount, and said means for decreasing the number of vortices is performed when the opening angle of the throttle valve exceeds the predetermined amount.

10. Apparatus as recited in claim 8, wherein said means for measuring the intensity of fluctuation comprises means for measuring the time intervals between vortices and means for calculating the standard deviation of the time intervals over the predetermined crank shaft rotation, and the means for decreasing the number of vortices is operative when the standard deviation exceeds a predetermined fraction of the averate time interval.

11. Apparatus as recited in claim 8 further comprising:
   (a) means for sensing engine speed;
   (b) said decreasing means operative to decrease the number of vortices by a first predetermined number in response to said intensity measuring means measuring the intensity of fluctuation exceeding said predetermined value and engine speed exceeding a predetermined engine speed; and
   (c) said decreasing means operative to decrease the number of vortices by a second predetermined number when the intensity measuring means measures the intensity of fluctuation exceeding said predetermined value and engine speed not exceeding said predetermined engine speed.

* * * * *